United States Patent [19]
Baik

[11] Patent Number: 5,664,615
[45] Date of Patent: Sep. 9, 1997

[54] SUN-BLIND FOR CAR WINDOW

[76] Inventor: Seong-Gon Baik, 243-1, Shinwon-dong, Koyang, Kyungki-do, Korea, Rep. of Korea

[21] Appl. No.: 623,049

[22] Filed: Mar. 28, 1996

[30] Foreign Application Priority Data

Mar. 28, 1995 [KR] Rep. of Korea .................. 95-6025

[51] Int. Cl.⁶ .................................................. B60J 1/20
[52] U.S. Cl. ................... 160/370.21; 160/34; 160/176.1
[58] Field of Search ........................... 160/370.21, 34, 160/37, 102, 107, 167 R, 176.1 R, 105, 172 R; 296/97.3, 97.8, 97.9, 97.2, 152

[56] References Cited

U.S. PATENT DOCUMENTS 1,949,653  3/1934  Moore ..................... 160/176.1 R X
3,719,221  3/1973  Hanson .................... 160/176.1 R X
4,932,710  6/1990  Chen ....................... 160/370.21 X

FOREIGN PATENT DOCUMENTS 2217762  1/1989  United Kingdom ............. 160/84.04

*Primary Examiner*—David M. Purol
*Attorney, Agent, or Firm*—Sixbey, Friedman, Leedom & Ferguson, P.C.; David S. Safran

[57] ABSTRACT

A sun-blind for a car window is disclosed. The sun-blind has laths separated at a regular interval by flexible strings and supporting nets to be stacked into a container box when not in use, and a hook at the upper supporting bar to hook the laths onto the edge of a window after fixing the container box at the lower frame of the window. If the window is rolled down, then contraction of the flexible strings makes the interval between each lath decrease conveniently in proportion with the height of the window top from the base of a window frame.

3 Claims, 5 Drawing Sheets

SUN-BLIND FOR CAR WINDOW

BACKGROUND OF THE INVENTION

The present invention relates to a sun-blind for a car window.

Most of the conventional sun-blinds for a car window are attached at the ceiling of the car near its window, and are rolled up when not in use. For shielding sunlight, they are pulled down and fixed with magic tapes mounted on the body of the car.

Flat rectangular or fan-shaped sun-blinds are also offered in the market, but are not designed to cooperate with the movement of the window by rolling down/up.

The above sun-blinds, however, have a shortcomming in that they cannot be used while the window is rolling up or down, and need to be detached from the window during opening and closing of the window.

SUMMARY OF THE INVENTION

It is accordingly an object of the present invention to provide a sun-blind for a car window, which is easy to install, disassemble and use.

In order to attain the above object of the present invention, by the provision of a sun-blind for the windows of motor vehicles having a plurality of parallel horizontal laths; a container box having an upper opening for receiving the laths, a lower surface of said container being removably secured to a lower frame of a window of a motor vehicle; a supporting bar for covering the upper opening of the container box when the laths are received in the container box, said supporting bar having a pair of guide plates which are slidably received in grooves that are formed therein, and having a hook provided at an intermediate location thereof for attaching the sun-blind to an upper edge of the window for holding said laths above said container box when use of the sun-blind is desired; supporting nets for holding the laths spread at predetermined levels, respectively, when the sun-blind is attached to the upper edge of the window; flexible elastic strings for drawing the supporting bar to the container box, ends of the flexible elastic strings being connected to the supporting bar and the container box, respectively; and a control lever located at a center of the supporting bar, around which ends of one of the supporting nets is wound in a first rotational direction and ends of other of the supporting nets are wound in an opposite rotational direction, to thereby control a tilting of the laths by rotation thereof by winding in one of the nets while the other is wound out. Furthermore, the flexible elastic strings pass through a pair of holes formed in the laths and the supporting bar has a length equal to a length of the container box when the guide bars are fully extended outwardly.

Accordingly, the sun-blind is formed by the regular placement of each lath when the container box is fixed at the body of a car near the bottom of a window, and the hook at the top supporting bar is hooked onto the upper edge of the window to stretch flexible strings.

BRIEF DESCRIPTION OF THE ATTACHED DRAWINGS

DETAILED DESCRIPTION OF THE PREFERRED EMBODIMENT

Figure 1:
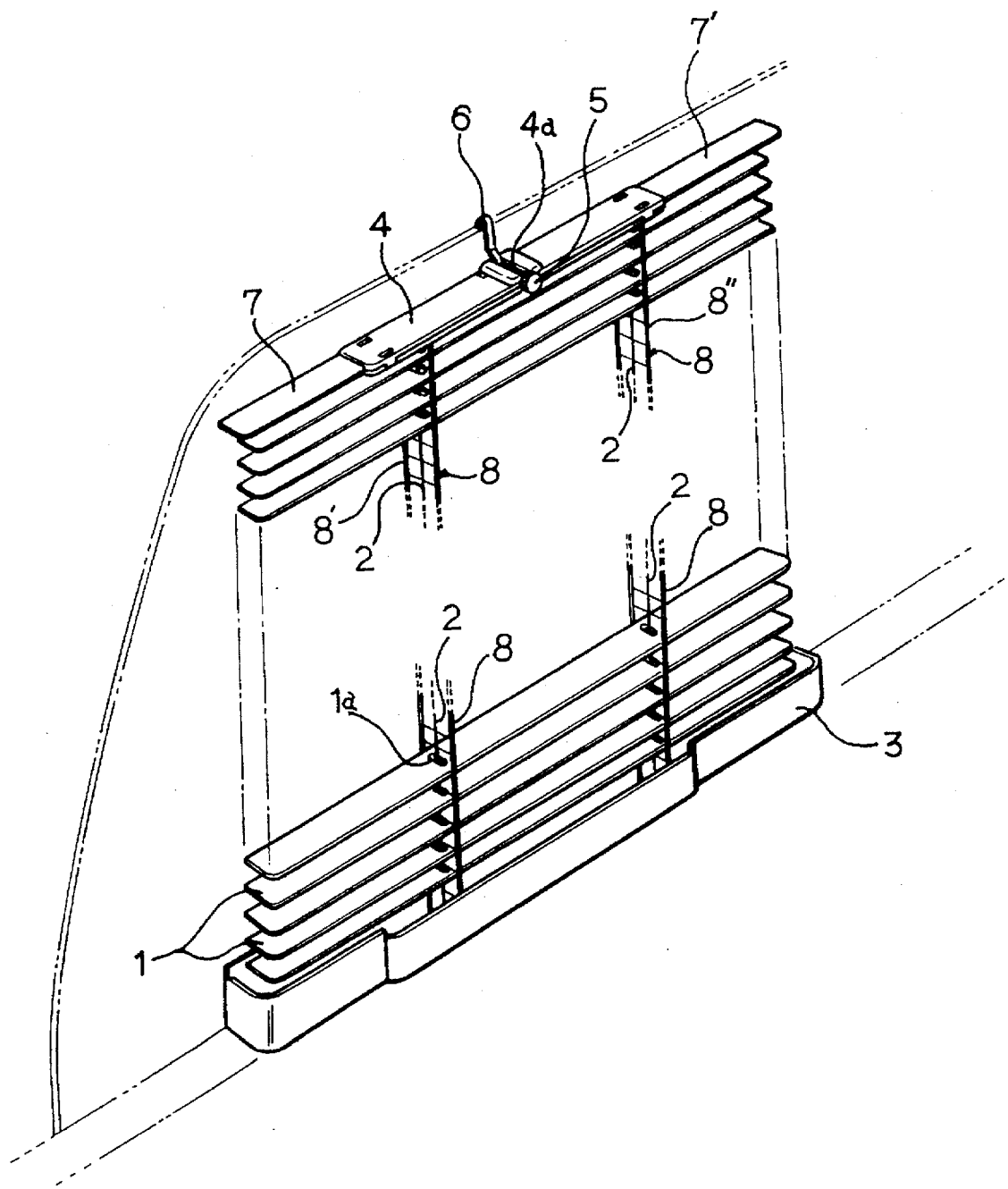
FIG. 1 is a perspective view of a preferred embodiment of a sun-blind of the present invention.

With reference to FIG. 1, a plurality of narrow and flat laths 1 are woven together by the flexible strings 2 to have interconnections to nearby laths at a predetermined interval, the lower end of the flexible strings 2 is attached to the bottom of the rectangular container box 3, and the upper end of the flexible strings are attached to the supporting bar 4, the strings 2 passing through openings 1a in the laths 1. The plurality of laths are supported at a certain interval by supporting nets 8.

When the supporting bar 4 is pulled up, the distance between the respective laths increases as the flexible strings stretch to form a blind.

There are auxiliary plates 7 and 7' at both ends of the top supporting bar to change the length of the supporting bar according to the type of a car window, and a hook 6 at the central top of the supporting bar to hook onto the upper edge of the car window W. The hook 6 is received in a slot 4a in the supporting bar 4.

Figure 2:
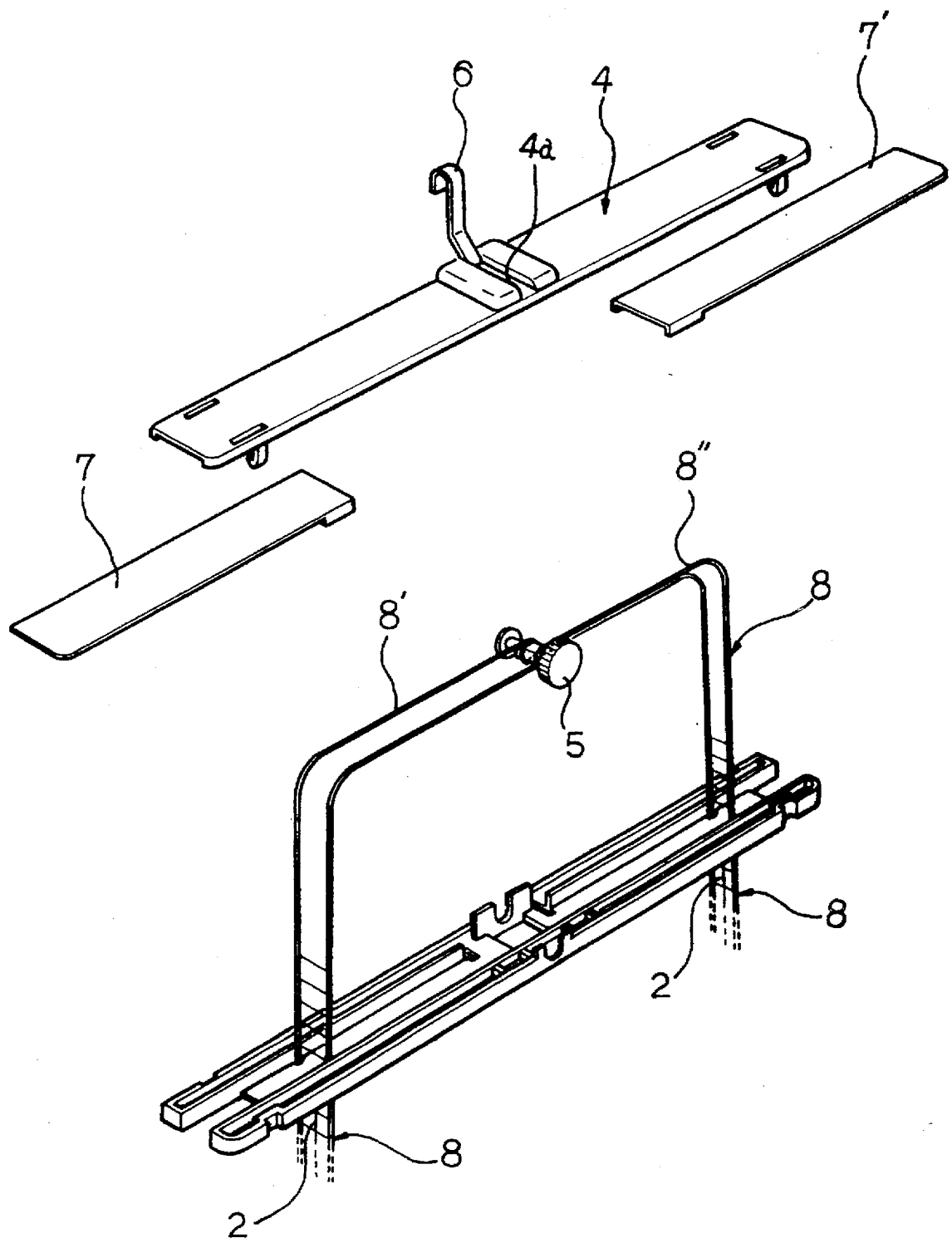
FIG. 2 illustrates a control lever for controlling the tilting of the laths of the present invention.

In addition, a control lever 5 is at the center of the supporting bar 4 to adjust the orientation angle of the laths. With reference to FIG. 2, because one end 8' of the supporting net 8 is fixedly rolled around the control lever 5, and the other end 8" is fixed to the lever 5. The mechanism of changing the orientation angle of the laths 1 is that the rotation of the lever 5 makes one end 8' of the supporting net 8 unrolled while the other end 8" becomes rolled around the lever 5, and as a result, causes the laths 1 to change their orientation angle.

The operation of the sun-blind according to the present invention will be described below.

Figure 4:
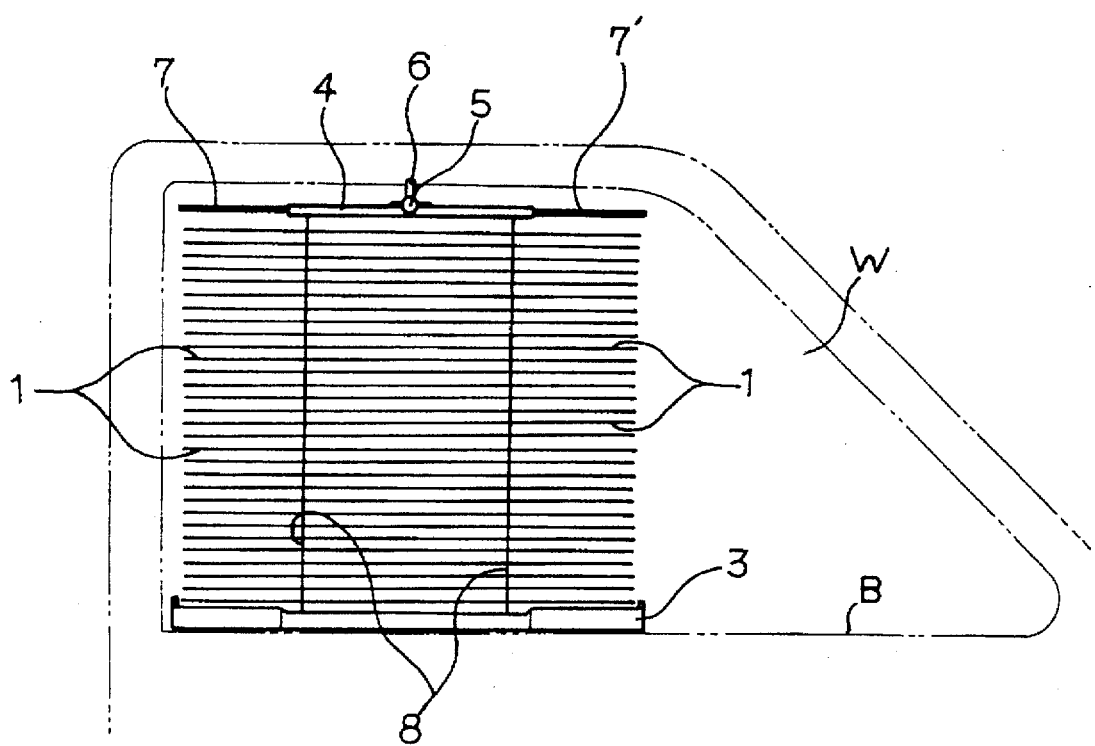
FIG. 4 illustrates a state in which the present invention is used when the window to which it is attached is fully closed.

With reference to FIG. 4, a user can fix the container box 3 at the body of a car B near the lower end of a window frame, and hook the top supporting bar of the laths 1 onto the upper edge of the window. After the above step, if the window of a car is rolled up, then the laths 1 is separate as the flexible strings stretch to shield the sunlight. Since the laths are oriented horizontally, they offer an unobstructed view for driving, the car can be driven safely.

Figure 5:
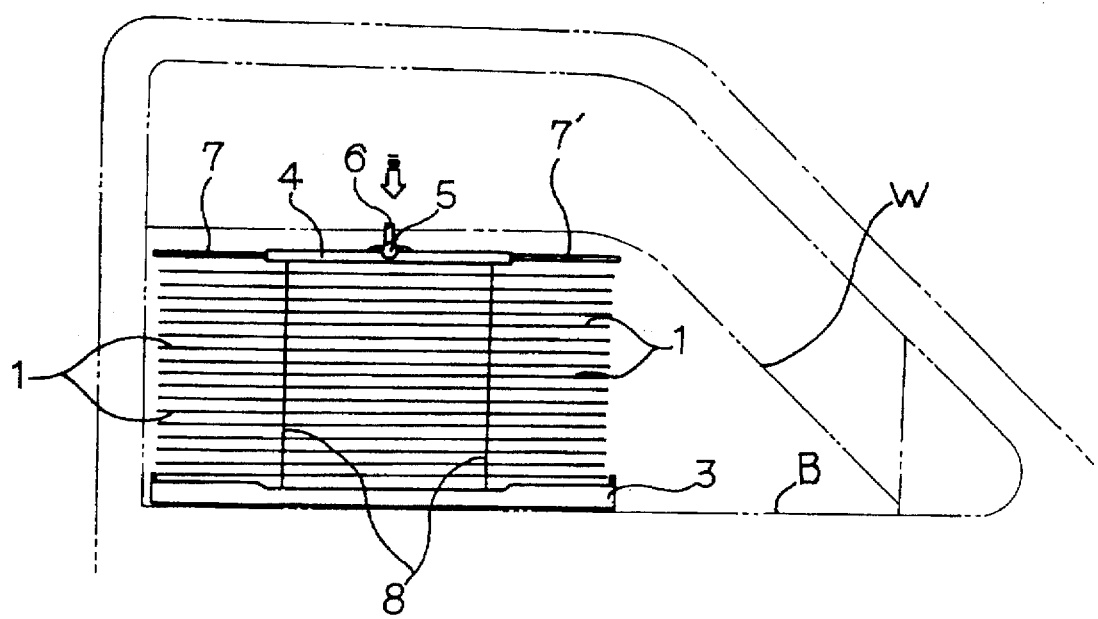
FIG. 5 illustrates a state in which the lath of the present invention has been lowered along with a window to a partially open position of the window.

As depicted in FIG. 5, the rolling down of the window W causes the flexible strings to shrink, and in turn the flexible strings make the laths 1 proportionally stacked into the container box 3.

A user can rotate the control lever 5 to change the orientation angle of the laths 1 and to adjust the inclination of the laths 1.

Figure 3:
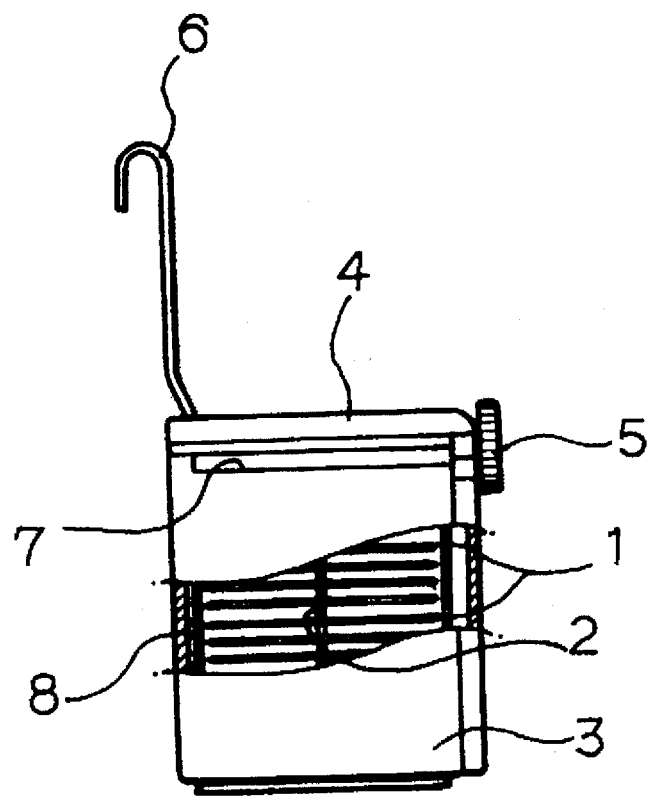
FIG. 3 is a partially cutaway side view of the present invention when the laths are accepted in the container box.

When not in use, the laths 1 can be stored in the container box by removing the hook from the window W, contraction of the flexible strings causes the laths to be stacked into the container box, and the top supporting bar acts as a cover of the container box 3, as in FIG. 3.

In addition to the description so far, auxiliary plates 7 and 7' on the supporting bar 4 can be adjusted to fit with the frame of the window according to the angle of the frame.

The above sun-blind for a car window in accordance with the present invention is formed by the laths 1 connected by the flexible strings and the supporting net to be stored in the container box when not in use. Due to its simple structure, the operation of the sun-blind is simply to hook the hook installed on the supporting bar onto the edge of the window. Since the container box is fixed at the body of a car near the bottom of the window frame, the use of the window such as rolling up and down is not interrupted.

Also when the lath is placed horizontally, the driver can obtain an unobstructed view of outside; therefore, the driver can drive the car safely.

The sun-blind in accordance with the present invention can be used conveniently for a long time because it can be stored in the container box when not in use.

What is claimed is:

1. A sun-blind for the windows of motor vehicles comprising:

a plurality of parallel horizontal laths;

a container box having an upper opening for receiving the laths, a lower surface of said container being removably secured to a lower frame of a window of a motor vehicle;

a supporting bar for covering the upper opening of the container box when the laths are received in the container box, said supporting bar having a pair of auxiliary plates for adjusting the length thereof, and having a hook provided at an intermediate location thereof for attaching the sun-blind to an upper edge of the window for holding said laths above said container box when use of the sun-blind is desired;

supporting nets for holding the laths spread at predetermined levels, respectively, when the sun-blind is attached to the upper edge of the window;

flexible elastic strings for drawing the supporting bar to the container box, ends of the flexible elastic strings being connected to the supporting bar and the container box, respectively; and a control lever located at a center of the supporting bar, ends of one of the supporting nets being connected to the control lever so as to be wound in a first rotational direction and ends of other of the supporting nets being connected to the control lever so as to be unwound said first rotational direction, to thereby control a tilting of the laths by rotation thereof by winding in one of the nets while the other is wound out.

2. The sun-blind according to claim 1, wherein the flexible elastic strings pass through a pair of holes formed in the laths.

3. The sun-blind according to claim 1, wherein the supporting bar has a length equal to a length of the container box when the auxiliary plates are fully extended outwardly.

* * * * *